(12) United States Patent
Nishikawa et al.

(10) Patent No.: US 9,852,329 B2
(45) Date of Patent: Dec. 26, 2017

(54) CALCULATION OF A CHARACTERISTIC OF A HOTSPOT IN AN EVENT

(71) Applicant: International Business Machines Corporation, Armonk, NY (US)

(72) Inventors: Hirofumi Nishikawa, Tokyo (JP); Tomohiro Shioya, Tokyo (JP); Kei Sugano, Tokyo (JP); Shoichiro Watanabe, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 12 days.

(21) Appl. No.: 14/807,909

(22) Filed: Jul. 24, 2015

(65) Prior Publication Data

US 2017/0024609 A1    Jan. 26, 2017

(51) Int. Cl.
| | | |
|---|---|---|
| G06K 9/00 | (2006.01) | |
| H04L 29/08 | (2006.01) | |
| G06K 9/32 | (2006.01) | |

(52) U.S. Cl.
CPC ..... *G06K 9/00335* (2013.01); *G06K 9/00778* (2013.01); *G06K 9/3233* (2013.01); *H04L 67/04* (2013.01); *H04L 67/18* (2013.01); *H04L 67/22* (2013.01); *G06K 9/00604* (2013.01)

(58) Field of Classification Search
None
See application file for complete search history.

(56) References Cited

U.S. PATENT DOCUMENTS

| | | | |
|---|---|---|---|
| 2004/0171381 A1* | 9/2004 | Inselberg | H04H 20/38 455/426.2 |
| 2006/0094409 A1* | 5/2006 | Inselberg | G06Q 30/02 455/414.1 |
| 2010/0004977 A1* | 1/2010 | Marci | G06Q 10/10 705/7.32 |
| 2013/0097245 A1* | 4/2013 | Adarraga | H04L 65/403 709/204 |
| 2013/0176438 A1* | 7/2013 | Mate | H04N 7/181 348/157 |

(Continued)

FOREIGN PATENT DOCUMENTS

| | | | |
|---|---|---|---|
| CN | 101621636 A | * | 1/2010 |
| CN | 101795395 B | | 7/2012 |

(Continued)

*Primary Examiner* — Delomia L Gilliard
(74) *Attorney, Agent, or Firm* — David Zwick

(57) ABSTRACT

A computer characterizes an area of interest in an event attended by an audience by receiving behavior information for an audience attending the event and event activity information for one or more areas in the event venue. The computer analyzes the audience behavior and event activity to determine the areas in the event venue to which the audience pays attention. The computer determines the objects in the areas in the event venue and determines one or more areas of interest based on the areas in the event venue to which the audience pays attention and the objects in the areas in the event venue to which the audience pays attention. The computer calculates a characteristic of the areas of interest in the event based on: the areas of interest, the objects in the areas in the event venue, and the analyzed audience behavior information related to the areas of interest.

18 Claims, 11 Drawing Sheets

(56) References Cited

U.S. PATENT DOCUMENTS

| | | | | |
|---|---|---|---|---|
| 2014/0118225 A1* | 5/2014 | Jerauld | .................. | A61B 5/486 |
| | | | | 345/8 |
| 2015/0051949 A1* | 2/2015 | Pickton | .............. | G06Q 30/0202 |
| | | | | 705/7.31 |
| 2015/0220157 A1* | 8/2015 | Marggraff | ............... | G06F 3/017 |
| | | | | 345/156 |
| 2015/0270983 A1* | 9/2015 | Givental | ............. | H04L 12/1831 |
| | | | | 382/103 |
| 2016/0192156 A1* | 6/2016 | Freeman | ............... | H04W 4/023 |
| | | | | 455/456.1 |

FOREIGN PATENT DOCUMENTS

| | | | |
|---|---|---|---|
| JP | 2005339479 | A | 12/2005 |
| JP | 2006003451 | A | 1/2006 |
| JP | 2007201988 | A | 8/2007 |
| JP | 2010050692 | A | 3/2010 |
| JP | 2014203184 | A | 10/2014 |

\* cited by examiner

CALCULATION OF A CHARACTERISTIC OF A HOTSPOT IN AN EVENT

BACKGROUND

The present invention relates to a hotspot in an event. More specifically, the present invention relates to the calculation of a characteristic of an event hotspot to which attention is paid.

A large-scale event is often carried out in a venue where tens of thousands people can be accommodated to view the event. It is important to detect the behavior of an audience in order to enhance the degree of audience satisfaction, and further, to enhance the operation of the venue.

Although it is important to understand the behavior of audiences in order to enhance the degree of audience satisfaction and to enhance the operation of the venue, it is generally difficult to understand the dynamically changing behavior of the audience. Although prior art techniques exist for measuring a degree of overall excitement of an audience, for example, by the magnitude of cheers, the prior art techniques do not understand the degree of excitement as it relates to a particular area of the venue or to a particular target. For example, when a variety of different sports competitions are simultaneously conducted in a sports event, it can not be assumed that all members of the audience pay attention to the same sports competition.

As taught in Japanese Patent Application No. 2006-003451, the object-specifying device 1 is provided with various sensors for measuring users' temperatures, sweating, and cardiac rates, an intention transmission switch 189 for instructing the specifying of an object by a user, and a directional microphone 151 for collecting the voice from the outside; when the user, viewing and listening the conference participated by a plurality of the objects, depresses the intention transmission switch 189, the voice from the directional microphone 151 is analyzed and the object under utterance is specified; the degrees of the "impression" etc., of the user for the object are inferred, based on the measured values from the respective sensors; the object information, including the identification information of the object under the utterance and the result of the inference relating to the user's "impression" are created and are transmitted to the event tendency analyzing apparatus 2; and in the event tendency analyzing apparatus 2, the tendency for various effects, such as conferences, is analyzed based on the object information.

Prior art does not dynamically adjust to understand the continually changing areas of the venue or targets to which members of the audience pay attention in order to enhance audience satisfaction or venue operations.

SUMMARY

Embodiments of the present invention disclose a method, computer program product, and system for characterizing an area of interest in an event attended by an audience. A computer receives behavior information for an audience attending an event and event activity information for one or more areas in an event venue. The computer analyzes the audience behavior information received and the event activity information received for the one or more areas in the event venue to determine the one or more areas in the event venue to which the audience pays attention. The computer determines one or more objects in the one or more areas in the event venue and determines one or more areas of interest in the event based on the determined one or more areas in the event venue to which the audience pays attention and the one or more objects in the one or more areas in the event venue to which the audience pays attention, wherein an area of interest is an area in the event venue or an object. The computer then calculates a characteristic of the one or more areas of interest in the event based on: the determined one or more areas of interest in the event, the determined one or more objects in the one or more areas in the event venue, and the analyzed audience behavior information related to the one or more areas of interest.

In another aspect of the present invention, the computer prepares characteristic display data including the one or more areas in the event venue to which the audience attending the event pays attention, a stationary state and a state of rapid change that are visually distinguished from each other, an audience behavior attribute related to the characteristic of the one or more areas of interest in the event, and displays the characteristic display data of the one or more areas of interest in the event.

In another aspect of the present invention, the computer determines the one or more areas of interest in the event by mapping the one or more objects in the one or more areas in the event venue to the determined one or more areas in the event venue to which the audience pays attention.

In another aspect of the present invention, the computer receives a selection of two or more of the areas of interest, calculates a time period which includes an occurrence of the selected two or more areas of interest and analyzes a detail of the occurrence of the selected two or more areas of interest in the calculated time period to determine whether an audience behavior attribute related to a characteristic of the selected two or more areas of interest is similar for the occurrence in the calculated time period. In response to determining that the audience behavior attribute related to the characteristic of the selected two or more areas of interest is similar for the occurrence in the calculated time period, the computer displays the calculated time period.

In another aspect of the present invention, the computer analyzes the audience behavior information received and the event activity information received for the one or more areas in the event venue by processing received video data of the one or more areas in the event venue to estimate a gaze of the audience attending the event, by processing received video data of the audience attending the event to estimate the gaze of the audience attending the event, by processing received audio data of the audience attending the event to obtain information relating to the audience attending event, by processing received gaze data of the audience attending the event who wear a gaze tracking device, and by estimating the gaze of the audience attending the event.

In another aspect of the present invention, the computer estimates the gaze of the audience attending the event by receiving identifying information about the one or more areas in the event venue to which the audience attending the event pays attention and/or identifying an area in the event venue being viewed on a video media player by the audience attending the event.

In another aspect of the present invention, the computer estimates the gaze of the audience attending the event based on a location of one or more video cameras providing the video data of the audience attending the event, and a line of sight of the audience in the video data.

In another aspect of the present invention, the computer processes received audio data of the audience attending the event using voice recognition processing and/or natural language processing to obtain information relating to the audience attending the event.

BRIEF DESCRIPTION OF THE SEVERAL VIEWS OF THE DRAWINGS

Features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

To define more clearly the terms used herein, the following definitions are provided, but the meaning of the terms should be interpreted broadly as known to the technical field to which the present invention relates.

The term, "hotspot", refers to an area or object of interest to which attention is paid in an event. There may be a plurality of hotspots in the same event.

The hotspot area may be a subset of the total area where the event is being carried out. The hotspot areas may be scattered throughout the area where the event is occurring.

The hotspot object may be a tangible object present in the event. The object may be, for example, but is not limited to, a living animal including a human, a vehicle or a vessel, a material, event content, or a channel of broadcasting. The living animal may be, for example, but is not limited to, a participant in the event such as a sport player, an animal including a domestic animal, a wild animal, and a race animal, for example, a race horse. The vehicle may be, for example, but is not limited to, a car including a racing car, an airplane including an airplane used for air show, a bicycle including a racing cycle, or a motorcycle including a racing motorcycle. The vessel may be, for example, but is not limited to, a boat including a racing boat. The material may be, for example, but is not limited to, a display item, or goods. The event content may be, for example, but is not limited to, a type of a competition such as athletic sports, tennis matches, basketball games, volley ball games, badminton games, or Judo matches; colloquium such as academic meeting; an exhibition: or a show such as a fashion show. The channel of broadcasting may be, for example, but is not limited to, an internet universal resource locator (URL) for a movie, a channel of a cable television, or a channel of normal television.

The term, "event", refers to any event including, but not limited to, a sports event, a racing event, a concert, an academic meeting, an exhibition, and a fashion show.

Figure 1:
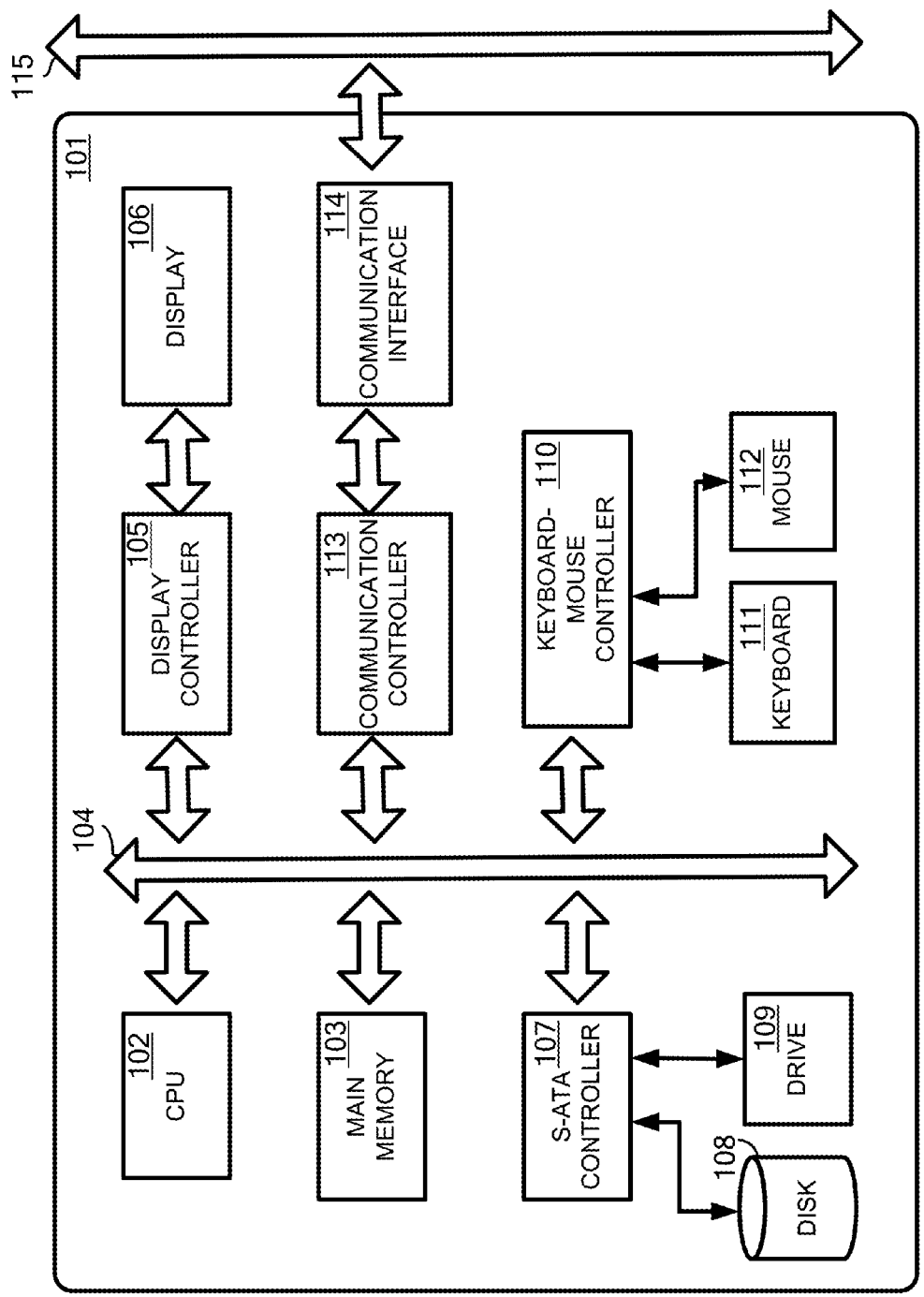
FIG. 1 is a basic block diagram of an exemplary device on which embodiments of the present invention can be executed.

With reference now to FIG. 1, a basic block diagram of an exemplary device on which embodiments of the present invention can be executed is illustrated.

The computer (101) may comprise one or more CPUs (102) and a main memory (103) connected to a bus (104). The CPU (102) may be preferably based on a 32-bit or 64-bit architecture. The CPU (102) may be, for example, but is not limited to, the Power® series of International Business Machines Corporation; the Core i™ series, the Core 2™ series, the Atom™ series, the Xeon™ series, the Pentium® series, or the Celeron® series of Intel Corporation; or the Phenom™ series, the Athlon™ series, the Turion™ series, or Sempron™ of Advanced Micro Devices, Inc. or other CPUs used for the tablet; the smartphone; the mobile phone; the personal digital assistant, the digital music player, the digital video player, the video game controller or terminal, or the internet television ("Power" is registered trademark of International Business Machines Corporation in the United States, other countries, or both; "Core i", "Core 2", "Atom", and "Xeon" are trademarks, and "Pentium" and "Celeron" are registered trademarks of Intel Corporation in the United States, other countries, or both; "Phenom", "Athlon", "Turion", and "Sempron" are trademarks of Advanced Micro Devices, Inc. in the United States, other countries, or both).

A display (106) such as a liquid crystal display (LCD) may be connected to the bus (104) via a display controller (105). The display (106) may be used to display, for management of the computer(s), information on a computer connected to a network via a communication line and information on software running on the computer using an appropriate graphics interface. A disk (108) such as a hard disk or a solid state drive, SSD, and a drive (109) such as a CD, a DVD, or a BD (Blu-ray disk) drive may be connected to the bus (104) via an SATA or IDE controller (107). Moreover, a keyboard (111) and a mouse (112) may be connected to the bus (104) via a keyboard-mouse controller (110) or USB bus (not shown).

An operating system, programs providing Windows®, UNIX® Mac OS®, Linux®, or a Java® processing environment, Java® applications, a Java® virtual machine (VM), and a Java® just-in-time (JIT) compiler, such as J2EE®, other programs, and any data may be stored in the disk (108) to be loadable to the main memory. ("Windows" is a registered trademark of Microsoft corporation in the United States, other countries, or both; "UNIX" is a registered trademark of the Open Group in the United States, other countries, or both; "Mac OS" is a registered trademark of Apple Inc. in the United States, other countries, or both; "Linux" is a registered trademark of Linus Torvalds in the United States, other countries, or both; and "Java" and "J2EE" are registered trademarks of Oracle America, Inc. in the United States, other countries, or both).

The drive (109) may be used to install a program, such as the computer program of an embodiment of the present invention, readable from a CD-ROM, a DVD-ROM, or a BD to the disk (108) or to load any data readable from a CD-ROM, a DVD-ROM, or a BD into the main memory (103) or the disk (108), if necessary.

A communication interface (114) may be based on, for example, but is not limited to, the Ethernet® protocol. The communication interface (114) may be connected to the bus (104) via a communication controller (113), may physically connect the physical device (101) to a communication line (115), and may provide a network interface layer to the TCP/IP communication protocol of a communication function of the operating system of the physical device (101). In this case, the communication line (115) may be a wired or a wireless LAN environment based on wireless LAN connectivity standards, for example, but is not limited to, IEEE® 802.11a/b/g/n ("IEEE" is a registered trademark of Institute of Electrical and Electronics Engineers, Inc. in the United States, other countries, or both).

The system of an embodiment of the present invention may comprise one or more computers of FIG. 1.

Figure 2A:
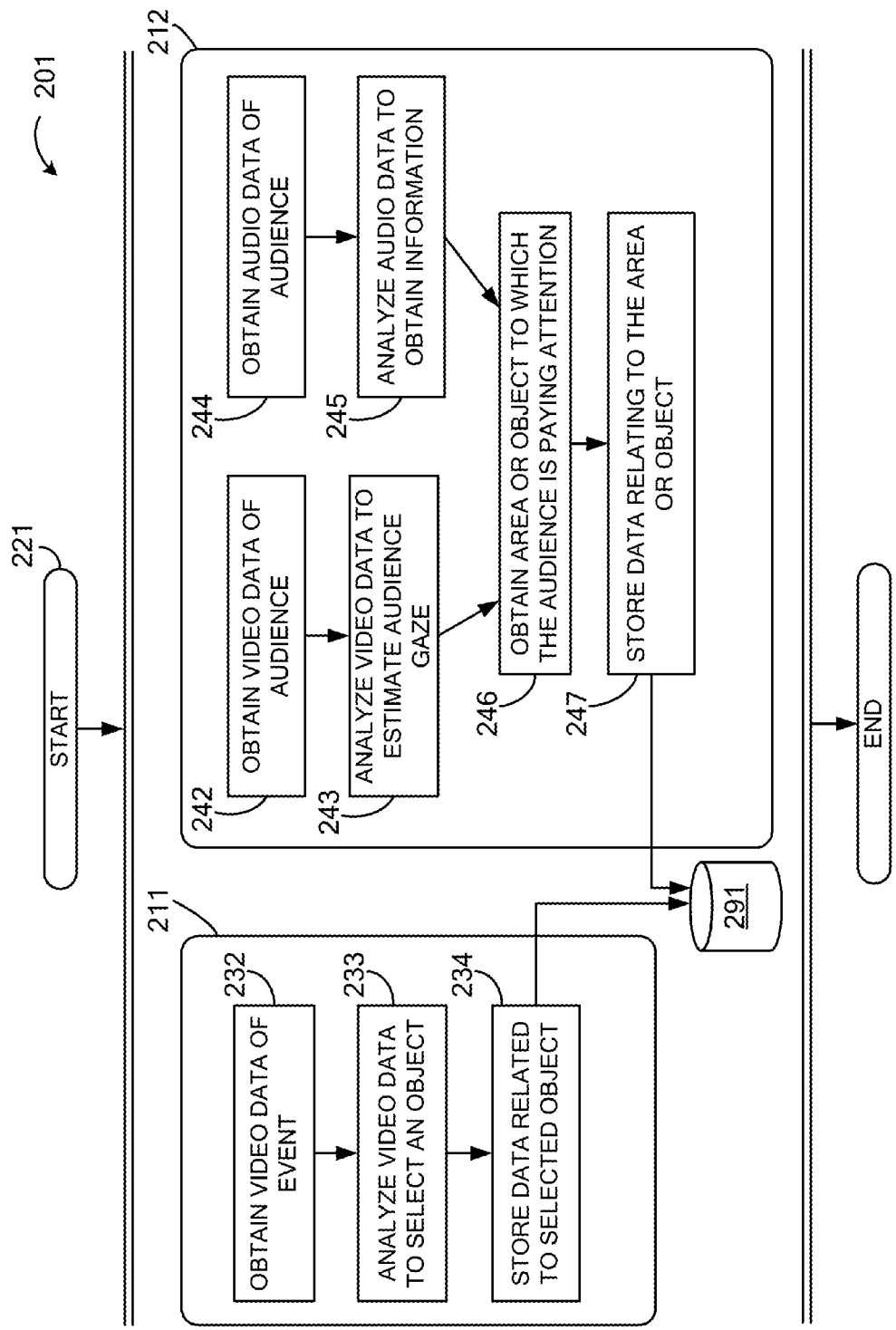
FIGS. 2A, 2B, and 2C illustrate a flowchart for calculating a characteristic of a hotspot in an event, in accordance with an embodiment of the present invention.
Figure 2B:
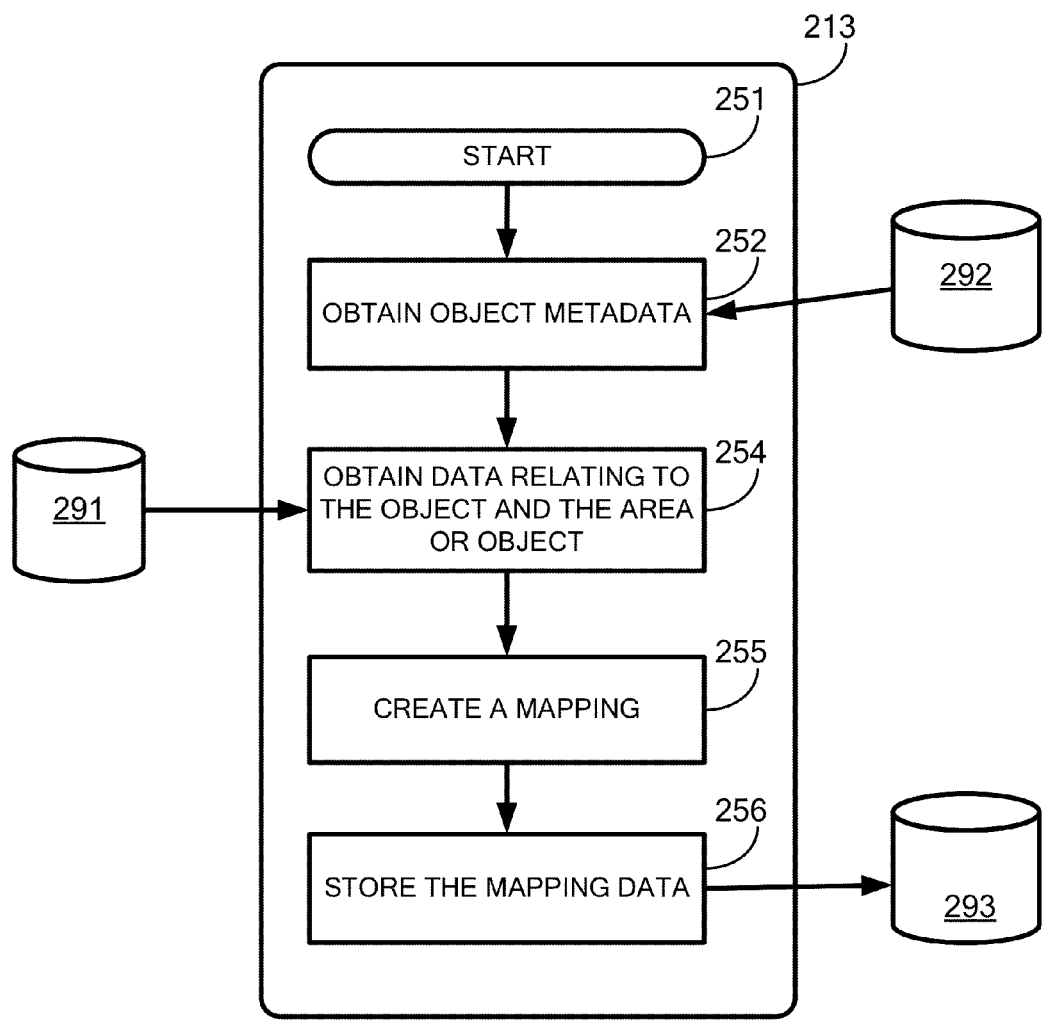
Figure 2C:
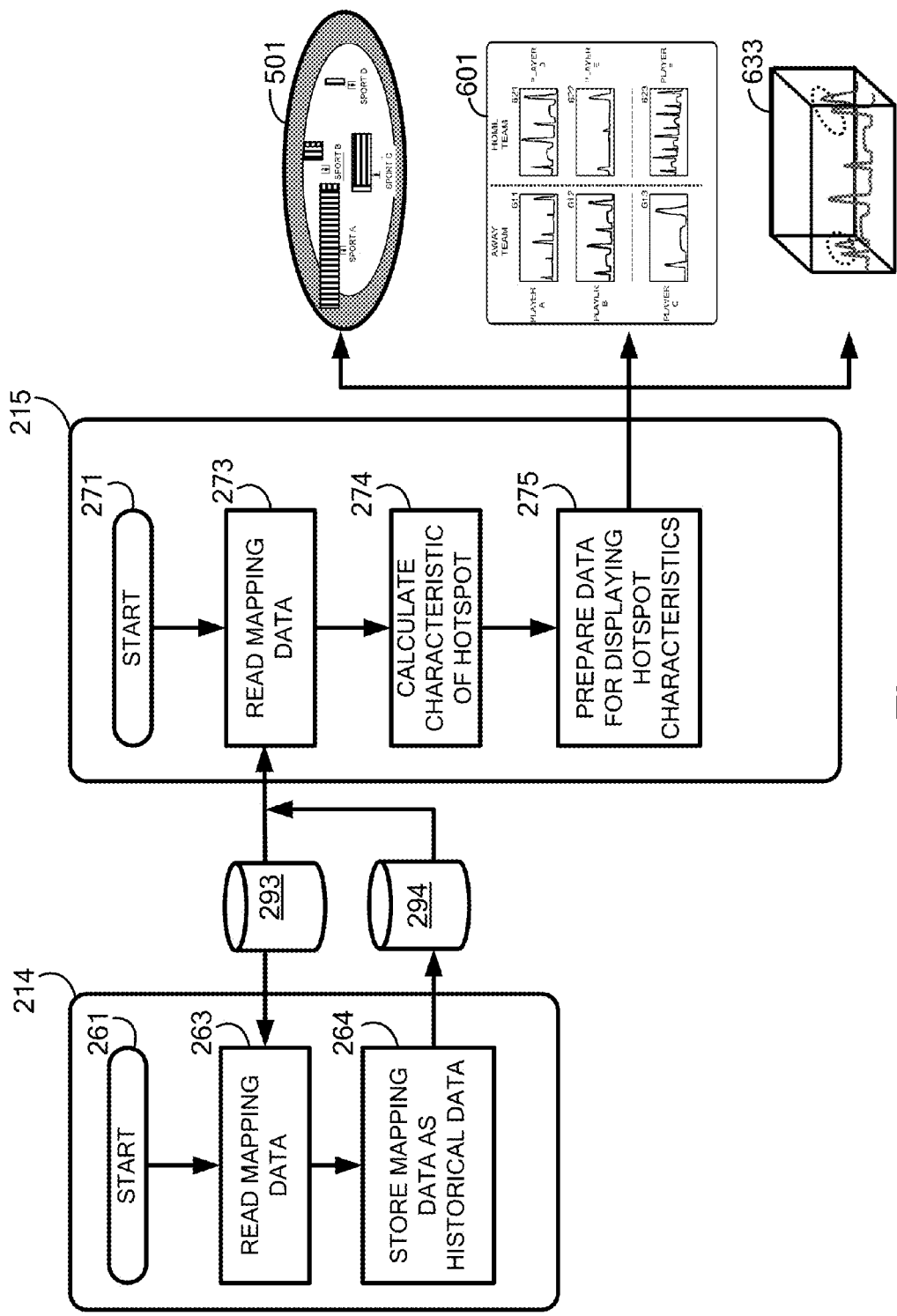

With reference now to FIGS. 2A, 2B, and 2C, a flowchart for calculating a characteristic of a hotspot in an event, in accordance with an embodiment of the present invention is illustrated.

The flowchart of FIGS. 2A, 2B and 2C are illustrated on an exemplary system 201 where an embodiment of the present invention is executed. The exemplary system 201 may include a plurality of computers for characterizing a hotspot: a computer 211 for processing data from the event-side in an event, a computer 212 for processing data from the audience-side in the event, a computer 213 for calculating a hotspot, a computer 214 for storing mapping data as historical data, and a computer 215 for calculating a characteristic of the hotspot and preparing data for displaying the characteristic of the hotspot. In various embodiments, an audience behavior attribute relates to the characteristic of the hotspot. In various embodiments, two or more of any combination of the computers (211 to 215) may be integrated into one computer.

Various embodiments may also include device(s) equipped to collect data from the audience-side (hereinafter referred to as "the audience device") of a venue where an event is currently occurring and device(s) to collect data from the venue (hereinafter referred to as "the venue device").

In an embodiment of the present invention, the audience device may be, for example, but is not limited to, a device having a data capturing function such as a video camera or digital camera for capturing video data from the audience-side. The data captured by the device may be used to obtain an area or object to which an audience attending the event pays attention. In one embodiment, the data captured may be used to estimate the gaze of the audience. Estimating the gaze of the audience enables the system 201 to determine the areas or objects being paid attention to, in the event, by the audience, and/or to identify an area or object in the event which is viewed on a video media player by the audience. In certain embodiments, it may not be necessary to identify the individuals in the captured video data nor understand the utterance of the audience in the captured video data.

In another embodiment, the audience device may be, for example, but is not limited to, a device having an audio collection function such as a microphone. The microphone may be equipped with a video camera or digital camera, or may be equipped with a directional microphone. The data collected by the device may be used to obtain an area or object to which an audience of the event pays attention. In one embodiment, the data collected may be used to obtain behavior information relating to the audio voice data including, but not limited to, a proper noun, such as a term relating the event included in utterances by the audience; a sense or feeling of the audience, based on utterances by the audience; a language spoken by the audience, based on utterances by the audience; a birthplace of the audience, based on utterances by the audience; a gender of the audience, based on utterances by the audience; an age group of the audience, based on utterances by the audience; and a degree of mastery of the audience, based on utterances by the audience. The degree of mastery may include the degree of audience knowledge or familiarity of the event or the hotspot. In certain embodiments, it may not be necessary to identify the individuals in the collected audio data, nor understand the utterance of the audience in the collected audio data.

In another embodiment, the audience device may be, for example, but is not limited to, a device capable of collecting a gaze of the audience, such as an eye tracking device; a head-mounted display; or a wearable glassware, such as glassware capable of following the wearer's gaze. The data collected by the device may be gaze direction (where one is looking) data. The data collected may be used for obtaining an area or object to which an audience of the event pays attention. In an embodiment, the data collected may be used for collecting gaze data from the audience. In certain embodiments, it may not be necessary to identify the individuals in the collected gaze data.

In an embodiment of the present invention, the venue device may be, for example, but is not limited to, a device having a data capturing function such as a video camera or digital camera for capturing data from the event-side. The data captured by the device may be video data used to obtain data on the event-side of the event and to select an object in the event. In certain embodiments, it may not be necessary to identify the selected object, namely individuals, in the captured video data.

A plurality of the audience devices may be located where the video data or audio data from the audiences can be collected. In an embodiment, the plurality of the audience devices may be located to cover all audiences in the event, or located such that a specific subset of audiences in the event are covered.

A plurality of the venue devices may be located where the video data from the event, especially the objects in the event and the event activity, can be captured. In an embodiment, the plurality of venue devices may be located to cover all areas or objects in the event.

Returning now to FIG. 2A, a flowchart for obtaining data related to an object from the event-side, as well for obtaining data from the audience-side, in accordance with an embodiment of the present invention, is illustrated.

At 221, computers 211, 212 start obtaining data from a plurality of venue devices and audience devices respectively. The plurality of the venue devices and audience devices may begin capturing data when the event starts or when audiences enter the venue for the event.

For each venue device, such as a video camera, computer 211 may, at 232, obtain video data of the event-side captured by that venue device. The video data may include an object(s) in the event. The object may be a tangible object present in the event.

At 233, computer 211 may process the video data to select the object(s) in the event captured in the event-side data. Selecting the object(s) in the event may be performed using any technique known in the art. The data used to select the object may include position or area information of the object, movement data related to the object, and any other information relating to the object. Position information for the object may be the specific area in the event, global positioning system (GPS) coordinates, or latitude/longitude information. Area information of the object may be information on any specific areas in the venue.

At 234, computer 211 may store data relating to the selected object into storage, such as an internal or external storage device, for example, a main memory database 291.

For each audience device, computer 212 may, at 242, obtain video data of the audience-side taken by an audience device, such as video camera. The video data may include one or more object(s) in the event and one or more audience members at the event.

At 243, computer 212 may process the video data to estimate the gaze of each audience member in the event. In one embodiment, estimating the gaze of the audience may be based on the location of the audience device and the line of sight of each audience member. Other embodiments may use other techniques known in the art to estimate the gaze of the audience.

In certain embodiments, estimating the gaze of the audience may include utilizing gaze data collected from gaze tracking devices worn by audience members.

The gaze data used to estimate gaze may include position of the audience, area information of the audience, and any other information relating to the audience. Position information of the audience may be information on the specific area in the event, GPS coordinates, or latitude/longitude information. Area information of the audience may be information on any specific areas in the venue.

The estimated gaze may be used for obtaining an area or object to which the audience at the event pays attention. The area may be any area in the event. The object may include, but is not limited to, an object in the event. The object may be a video playing device, such as a big screen provided by the venue, or a portable device screen, such as a tablet, smartphone, mobile phone, notebook computer, or portable video player.

At 244, computer 212 may obtain audio data collected by an audience-side microphone. The audio data may include audio data of audience member(s) at the event.

At 245, computer 212 may process the audio data by using voice recognition processing and/or a natural language processing to obtain information, such as the information described above, from the audio data.

At 246, computer 212 may utilize the analyzed audience data, such as the estimated gaze, the audio data, or any combination thereof, to obtain an area or object to which the audience at the event pays attention.

At 247, computer 212 may store the data, relating to the area or object to which the audience at the event pays attention, into storage, such as an internal or external storage device, for example, the main memory database 291.

In various embodiments, computers 211, 212 may obtain data periodically, such as on a timed basis. In other embodiments, computer 211, 212 may obtain data each time the action completes, for example a race ends or a goal is scored.

With reference now to FIG. 2B, a flowchart for calculating a hotspot, in accordance with an embodiment of the present invention, is illustrated.

At 251, computer 213 starts calculating a hotspot. At 252, computer 213 may obtain metadata for an object from storage 292, in which metadata relating to the event is stored. The metadata may include data relating to each object in the event. For example, for an athletic sporting event, the metadata may include, but is not limited to, the area in the venue in which each competition is performed, each player's number, and the athletic event associated with each player. If the event is football, the metadata may include, for example, a player's team, either home or away, the player's uniform number, and the player's position on the team.

For each object, computer 213 may, at 254, obtain data related to the object from the main memory database 291. Data related to the object may include event-side data stored at 234 (FIG. 2A) for the object, and audience-side data stored at 247 (FIG. 2A) for the object or for the area relating to the object.

At 255, computer 213 may create a mapping between the object and the area or object to which the audience at the event pays attention to calculate a hotspot. The created mapping associates the object with the area or object to which the audience at the event pays attention.

At 256, computer 213 stores the mapping data into storage, such as an internal or external storage device, for example, main memory database 293.

With reference now to FIG. 2C, a flowchart for calculating a characteristic of a hotspot and displaying the characteristic of the hotspot, in accordance with an embodiment of the present invention, is illustrated.

At 261, computer 214 starts storing the mapping data as historical data.

For each mapping created at 255 (FIG. 2B), computer 214 may, at 263, read the mapping data from storage 293.

At 264, computer 214 may store the mapping data as historical data into, for example, a relational database 294.

At 271, computer 215 begins the preparation of data to display the characteristics of the hotspot.

For each mapping created at 255, computer 215 may, at 273, read the mapping data from storage 293 or from the historical data storage 294. The mapping data from storage 293 may be used to calculate a real time characteristic of the hotspot. The mapping data from the historical data storage 294 may be used to calculate a historical characteristic of the hotspot.

At 274, computer 215 may calculate a characteristic of the hotspot based on the mapping data. Characteristics of a hotspot will be described in further detail below with reference to FIGS. 3, 5A, and 6A.

At 275, computer 215 may prepare data to be displayed showing characteristics of hotspots and, optionally, showing the hotspot itself on the display 106 (FIG. 1).

In various embodiments, computer 215 may prepare the data such that the area or object to which attention is paid can be visualized, a stationary state and a state of rapid change can be visually distinguished from each other, and attributes of the audience can be visualized. The data prepared to visually distinguish a stationary state from a state of rapid change may include, for example, time-series data or dynamic data. Attributes of the audience may include, for example, but is not limited to, audience emotions, senses, or feelings about the hotspot.

In certain embodiments, computer 215 may detect similar occurrences among hotspots in a defined time period sequence. Detecting a similar occurrence among hotspots in a defined time period sequence may result from selecting of at least two hotspots from a group of hotspots, calculating a time period in which common hotspots appear from among the selected hotspots; analyzing details of occurrences in the time period of each selected hotspot to determine whether or not the occurrences among the selected hotspots have similarity in the calculated time period; and, in response to determining that the occurrences among the selected hotspots have the similarity in the calculated time period, displaying the calculated time period of the occurrences having the similarity among the selected hotspots. The calculated time period when the occurrences among the selected hotspots have the similarity may be displayed, for example, on a graph which shows the area or object to which attention is paid.

Exemplary display screen images 501, 601, 633 display the characteristics of hotspots and will be described in further detail with reference to FIGS. 5A, 5B, 6A, and 6B.

In an embodiment, a computer other than computer 215 may display the characteristic of the hotspot and, optionally, the hotspot on the display 106.

Figure 3:
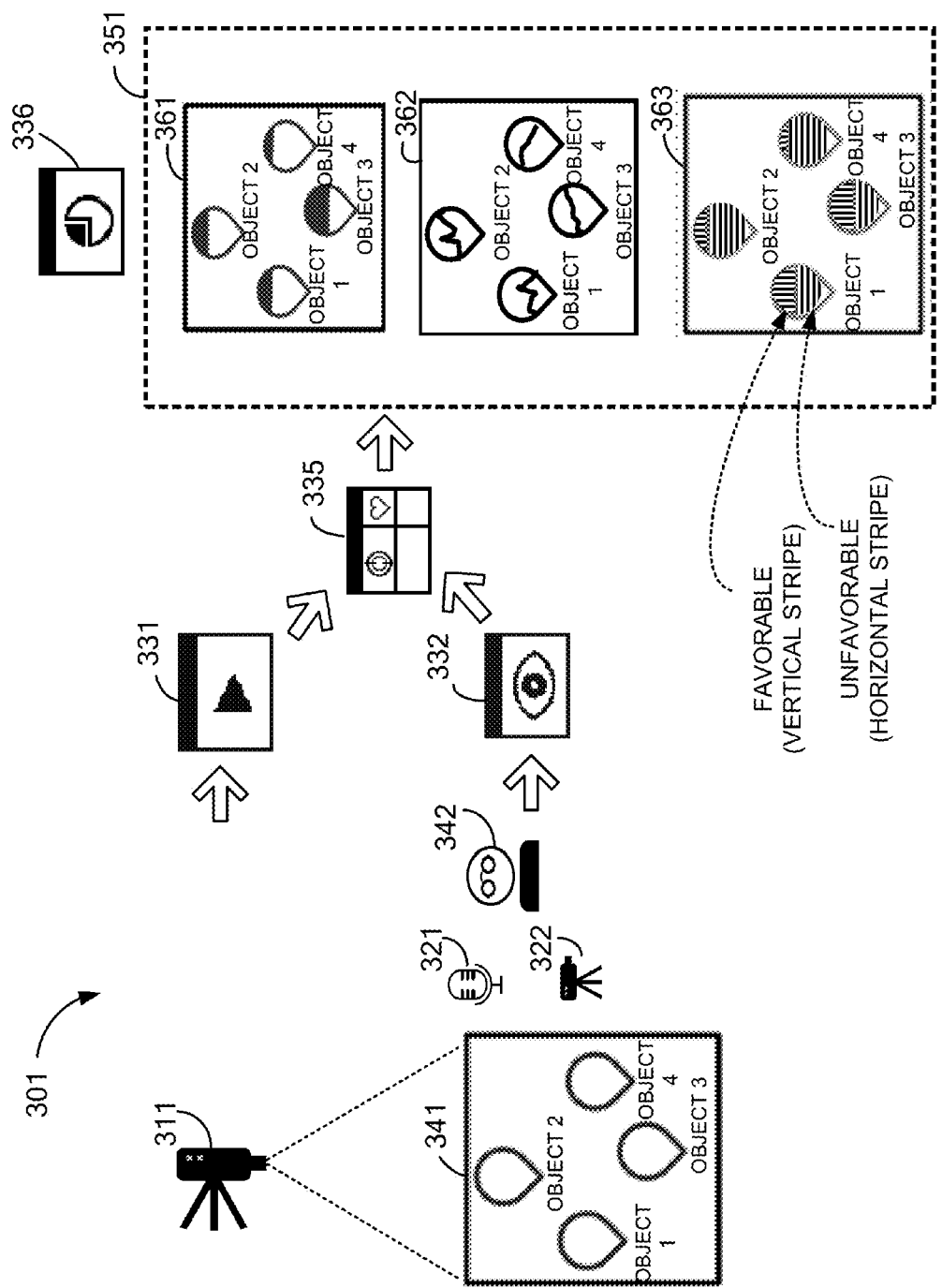
FIG. 3 illustrates a process for calculating a characteristic of a hotspot in an event and for displaying the characteristic as a graphical display, in accordance with an embodiment of the present invention.

With reference now to FIG. 3, a process 301 for calculating a characteristic of a hotspot in an event and for displaying the characteristic as a graphical display, in accordance with an embodiment of the present invention, is illustrated.

As described above with reference to FIGS. 2A, 2B, and 2C, a plurality of venue devices 311, such as video cameras, are located where the video data from the event 341, especially the objects 1 to 4 in the event, can be captured. Similarly, a plurality of audience devices, such as microphones 321 and/or video cameras 322 are located where the video data or audio data from the audience 342 can be fully or partially captured.

A computer 331 for processing event-side data from the event 341 may obtain video data from the venue devices 311, and analyze the video data to identify and select objects 1 to 4.

A computer 332 for processing audience-side data from the event 341 may obtain video data and/or audio data from the audience devices 321, 322, analyze the video data and/or the audio data to obtain areas or objects to which the audience 342 at the event 341 pays attention.

A computer 335 may calculate a hotspot and the characteristic of the hotspot, and prepare data for displaying the characteristic of the hotspot.

A computer 336 may display the characteristics 351 of the hotspot on a display 106 (FIG. 1). Exemplary display screen images 361, 362, 363 representing hotspot characteristics are illustrated. The characteristics 351 of the hotspot may be represented as, for example, but not limited to, a display 361 of the degree of attention of the audience 342 toward the hotspot(s) at a defined point of time; a display 362 of sequential changes, over a defined time period, of the degree of attention of the audience 342 toward each of the hotspot objects; a display 363 of an attribute value for each attribute of the audience related to the characteristic, in this example audience favorability toward each of the hotspot objects; a broadcasting source in which the audience who views the hotspot has interest; and any combination thereof.

Exemplary display screen image 361 shows a view of a degree of attention of the audiences 342 toward each of the hotspots, objects 1 to 4, at a defined point of time. The degree of the attention of the audience 342 may be represented as, for example, a color such as red where more red indicates a higher degree of attention.

Exemplary display screen image 362 shows a view of sequential changes over a defined time period, of the degree of attention of the audiences 342 toward each of the hotspot objects 1 to 4. The sequential changes may be represented, for example, as a graph.

Exemplary display screen image 363 shows a view of an audience 342 attribute value toward each of the hotspot objects 1 to 4. If the characteristic is emotions toward the hotspot object, with audience attributes such as "favorable" or "unfavorable", attribute values may be represented as, for example, colors, patterns, or numerals of ratio of "favorable" to "unfavorable". The exemplary attribute value of "favorable", in exemplary display screen image 363, is represented with vertical stripes, while the "unfavorable" attribute value is represented with horizontal stripes. Further, the rate of the "favorable" and "unfavorable" in an object may be represented as, for example, area ratio in each icon of the hotspot object.

Figure 4:
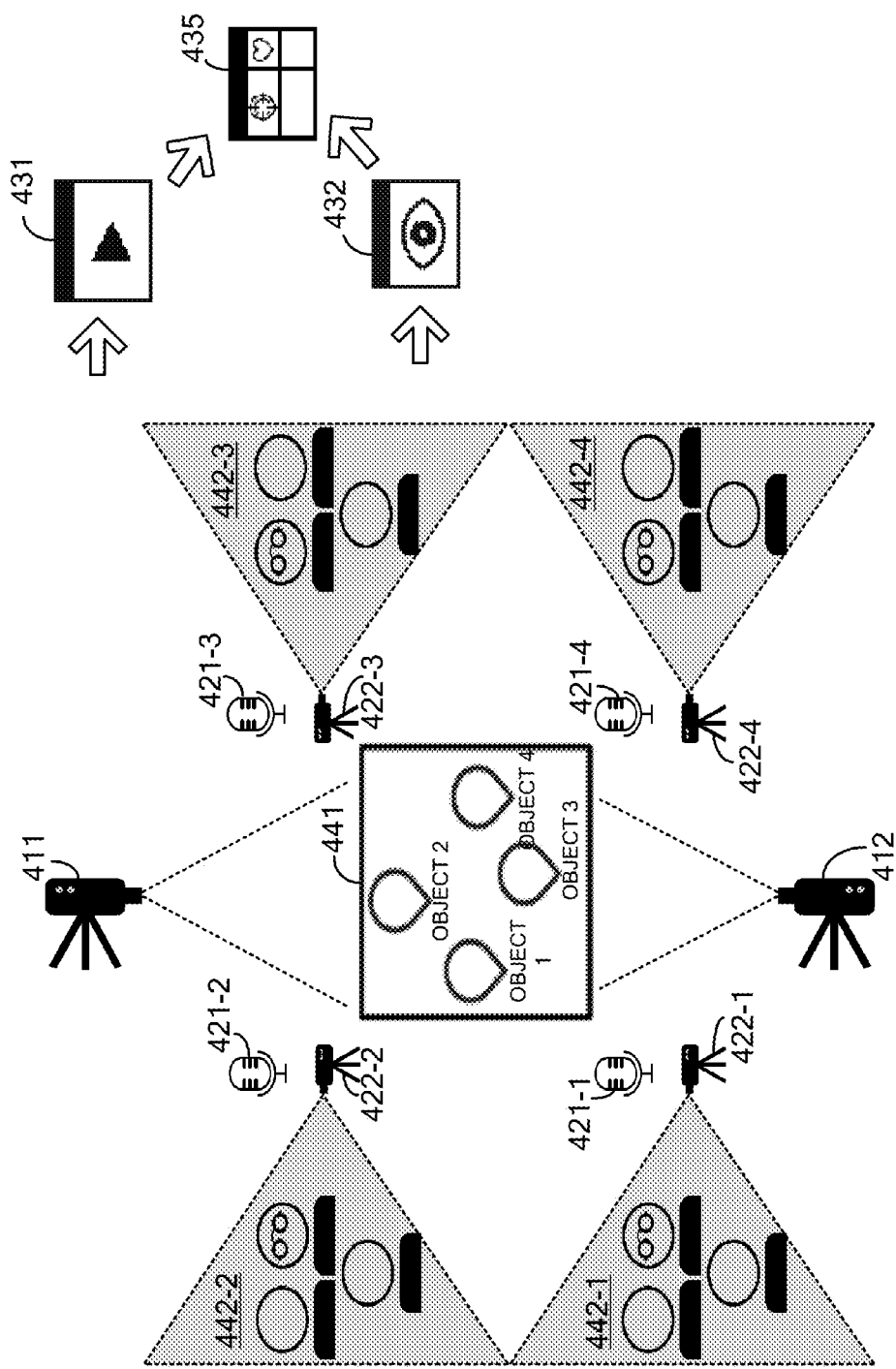
FIG. 4 illustrates a process for calculating a characteristic of a hotspot, in accordance with an embodiment of the present invention.

With reference now to FIG. 4, a process for calculating a characteristic of a hotspot, in accordance with an embodiment of the present invention, is illustrated. FIG. 4 illustrates an embodiment of the present invention in which a plurality of venue and audience devices may capture data from a plurality of audience members or audience areas.

As described above, with reference to FIGS. 2A, 2B, and 2C, a plurality of venue devices 411, 412, such as video cameras, are located where the video data from the event 441, especially the objects 1 to 4 in the event, can be captured. Similarly, a plurality of audience devices, such as microphones 421-1, 421-2, 421-3, 421-4, video cameras 422-1, 422-2, 422-3, 422-4, or combinations thereof are located where the video data or audio data from the audience 442-1, 442-2, 442-3, 442-4 can be captured.

Computers 431, 432, 435 correspond to computers 331, 332, 335 (FIG. 3), respectively.

Figure 5A:
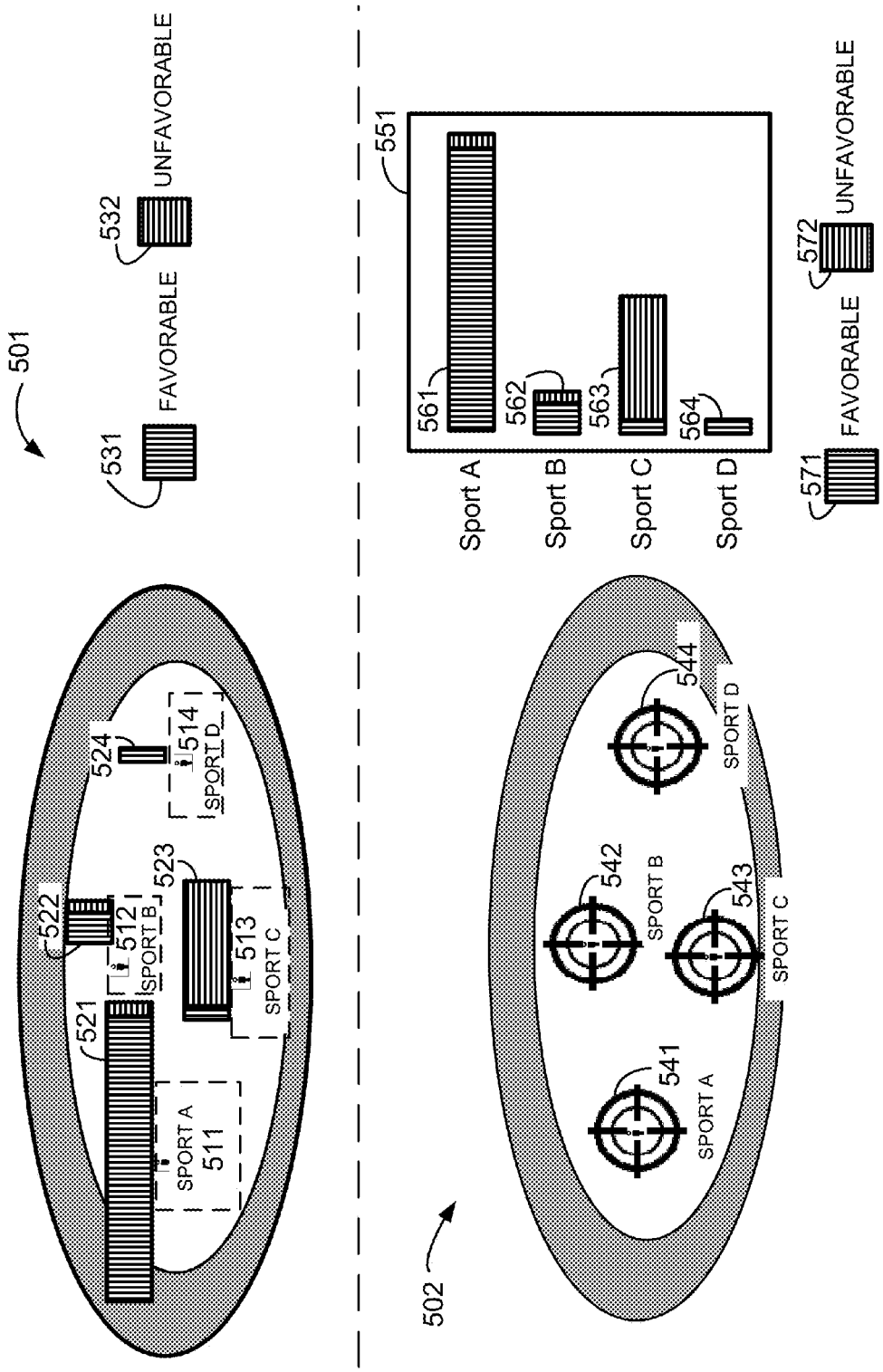
FIG. 5A is an exemplary display of a hotspot characteristic, in accordance with an embodiment of the present invention.

Referring now to FIG. 5A, an exemplary display of a hotspot characteristic, in accordance with an embodiment of the present invention.

Two different types of exemplary screen images 501, 502 displaying hotspot characteristics on a display 106 (FIG. 1) are illustrated for an exemplary sporting event occurring in an exemplary sports stadium which can accommodate a hundred thousand audience members. Four different kinds of athletic events 511, 512, 513, 514, or sports, are occurring simultaneously in this exemplary sporting event and are the hotspots for which characteristics are displayed.

Exemplary display screen image 501 shows the attribute values for the audience attribute, feeling, about each of the hotspots, sport A 511, sport B 512, sport C 513, and sport D 514. In this exemplary display, the audience attributes are favorable 531 and unfavorable 532. In the exemplary display screen image 501, the attribute values 521, 522, 523, 524 are displayed together with their respective hotspot 511, 512, 513, 514 on an image of the sports stadium.

Exemplary display screen image 502 also shows the attribute values for the audience attribute, feeling, about each of the hotspots, sport A 541, sport B 542, sport C 543, and sport D 544. In this exemplary display, the audience attributes are favorable 571 and unfavorable 572. In the exemplary display screen image 502, the attribute values

561, 562, 563, 564 are displayed as a table 551. The table 551 may be displayed separately or with an image of the sports stadium.

Figure 5B:
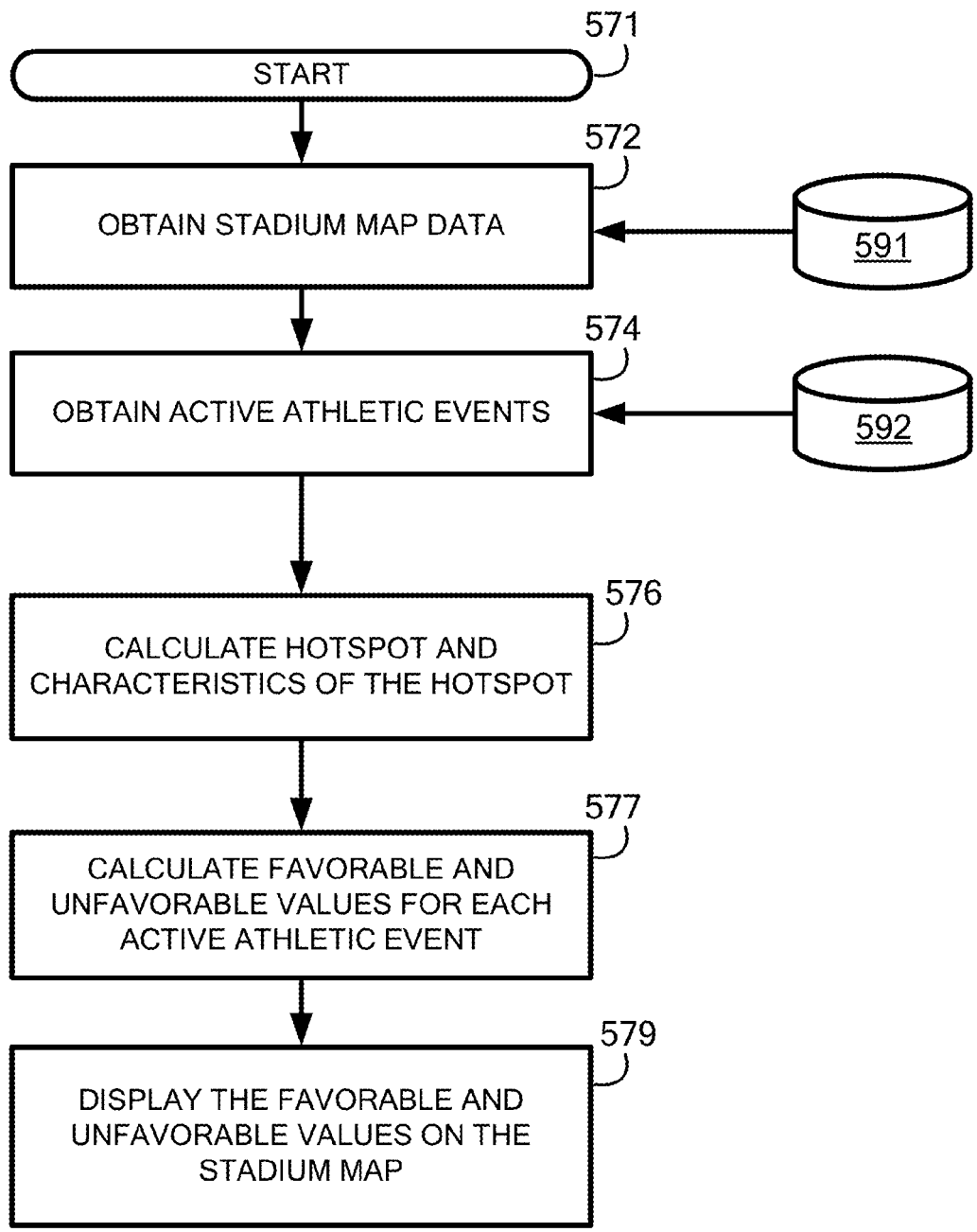
FIG. 5B illustrates a flowchart for displaying the hotspot characteristic in the exemplary display of FIG. 5A, in accordance with an embodiment of the present invention.

Referring now to FIG. 5B and with continuing reference to FIG. 5A, a flowchart for displaying the hotspot characteristics shown in the exemplary display 501, 502 of FIG. 5A, in accordance with an embodiment of the present invention, is illustrated.

At 571, a computer 101 (FIG. 1) begins calculating the characteristic of the hotspot, in this exemplary embodiment the athletic events of FIG. 5A, and preparing data to display those characteristics.

At 572, computer 101 may obtain a stadium map data from storage 591 in which stadium map data relating to the event is stored. The stadium map data may include, but is not limited to, areas for audience seating and location where each athletic event is performed.

At 574, computer 101 may obtain, from a main memory database 592, the data relating to the active athletic events currently occurring at the sporting event.

For each athletic event, computer 101 may, at 576, create a mapping between the athletic event (object) and the area or object to which the audience of the event pays attention, in order to calculate a hotspot. A hotspot may be calculated based on data relating to each identified object, in this example sport A 511, 541, sport B 512, 542, sport C 513, 543, and sport D 514, 544, and the data relating to the area or object to which the audience of the event pays attention. The resulting hotspot(s) is the object associated with the area or object to which the audience of the event pays attention. Computer 101 may also calculate the characteristic of the hotspot on the basis of the mapping data and the stadium map data.

At 577, computer 101 may calculate attributes values for each athletic event in the sporting based on the data relating to the area or object to which the audience of the event pays attention. The attribute values in this example are, but are not limited to, "favorable" and "unfavorable" values, or n-values ("n" is a positive integer).

At 579, computer 101 may prepare data for displaying the characteristic of the hotspot and the hotspot itself, and may display the data on the display 106. The computer 101 may, for example, display an icon for indicating the favorable and unfavorable values on the image of the sports stadium.

The exemplary display data may be recalculated and the display refreshed, for example, on a timed basis, when a display user requests a refresh, and when an athletic event changes status, such as begins, completes, or changes players.

Figure 6A:
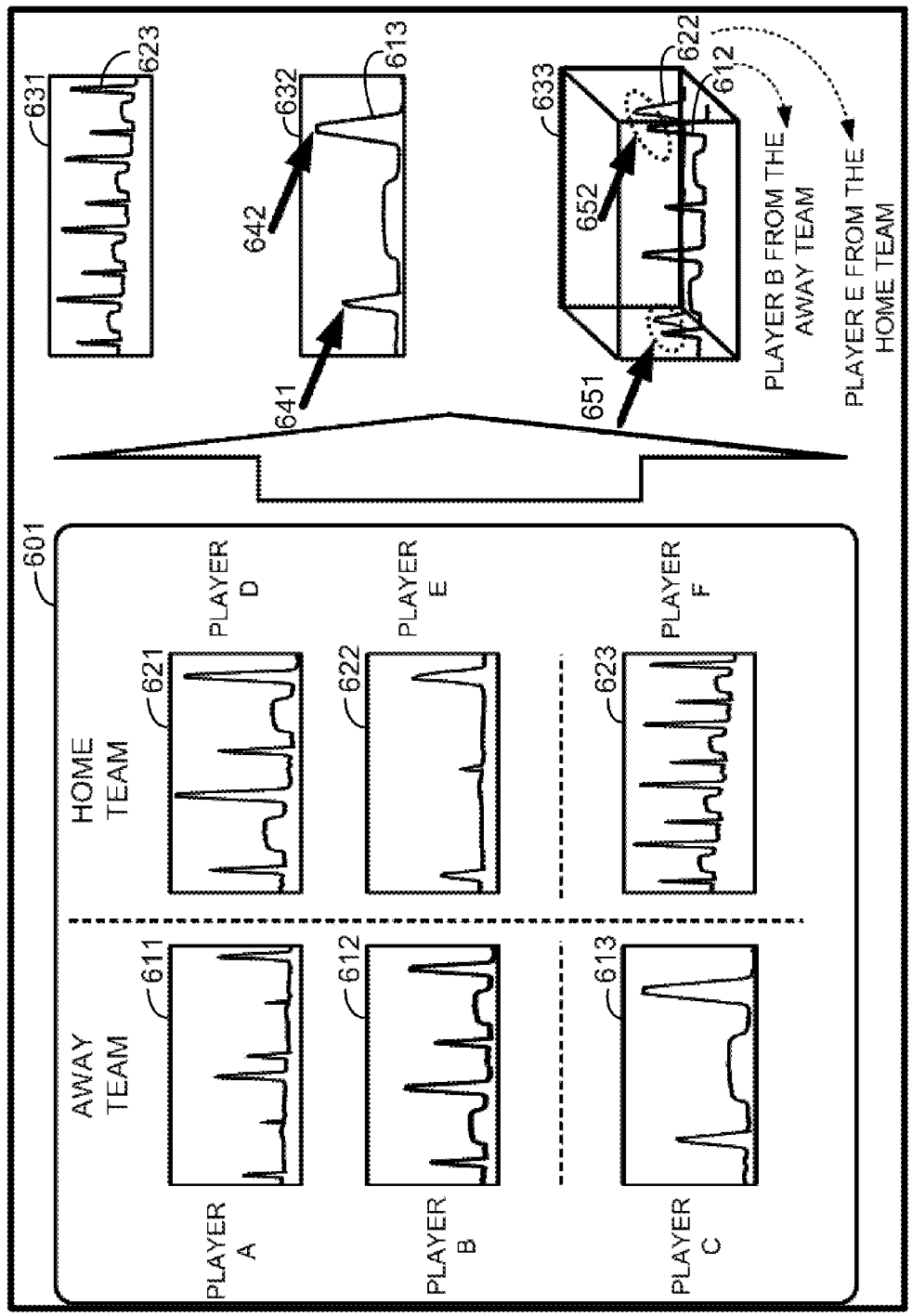
FIG. 6A is an exemplary display of a hotspot characteristic, in accordance with an embodiment of the present invention.

FIG. 6A is an exemplary display of a hotspot characteristic, in accordance with an embodiment of the present invention. FIG. 6A illustrates another embodiment for displaying the characteristics of the hotspot. FIG. 6A illustrates a hotspot characteristic display for an exemplary soccer game between a home team and an away team occurring in an exemplary soccer stadium which can accommodate a hundred thousand audience members. Exemplary screen images 601, 631, 632 display a characteristic of each hotspot and exemplary screen image 633 displays a combination of characteristics for two hotspots.

The exemplary display screen image 601 shows six views 611, 612, 613, 621, 622, 623, each view displaying sequential changes to the degree of audience attention paid to the hotspot over a defined time period.

In various embodiments, a new view or an enlarged image 631 may be displayed for the hotspot, in this example player F 623, with the largest integrated value for the degree of audience attention paid to any of the hotspots 611, 612, 613, 621, 622, 623 displayed over the defined period of time. In various embodiments, predictions, such as a most valuable player candidate, may be determined by using the integrated value, since it may indicate the player has garnered much of the audience attention over the defined period of time.

The exemplary display screen images 613, 632 shows a point in time 642, when a goal is scored. The value for the audience degree of attention is highest at that point of time over the defined period of time displayed. Another high value point in time 641, though not as high a value as when the goal was scored, indicates a high degree of audience attention. Accordingly, it is may be assumed that a quality play occurred at that point in time 641 by player C of the away team.

The exemplary display screen image 633 shows the combination of views 612 and 622. The exemplary view 633 shows the point in time 652, when a goal is scored. Exemplary display screen image 633 also shows another common point in time 651 where the value for the audience degree of the attention is high, possibly indicating an exciting play between player B of the away team and player E of the home team.

Figure 6B:
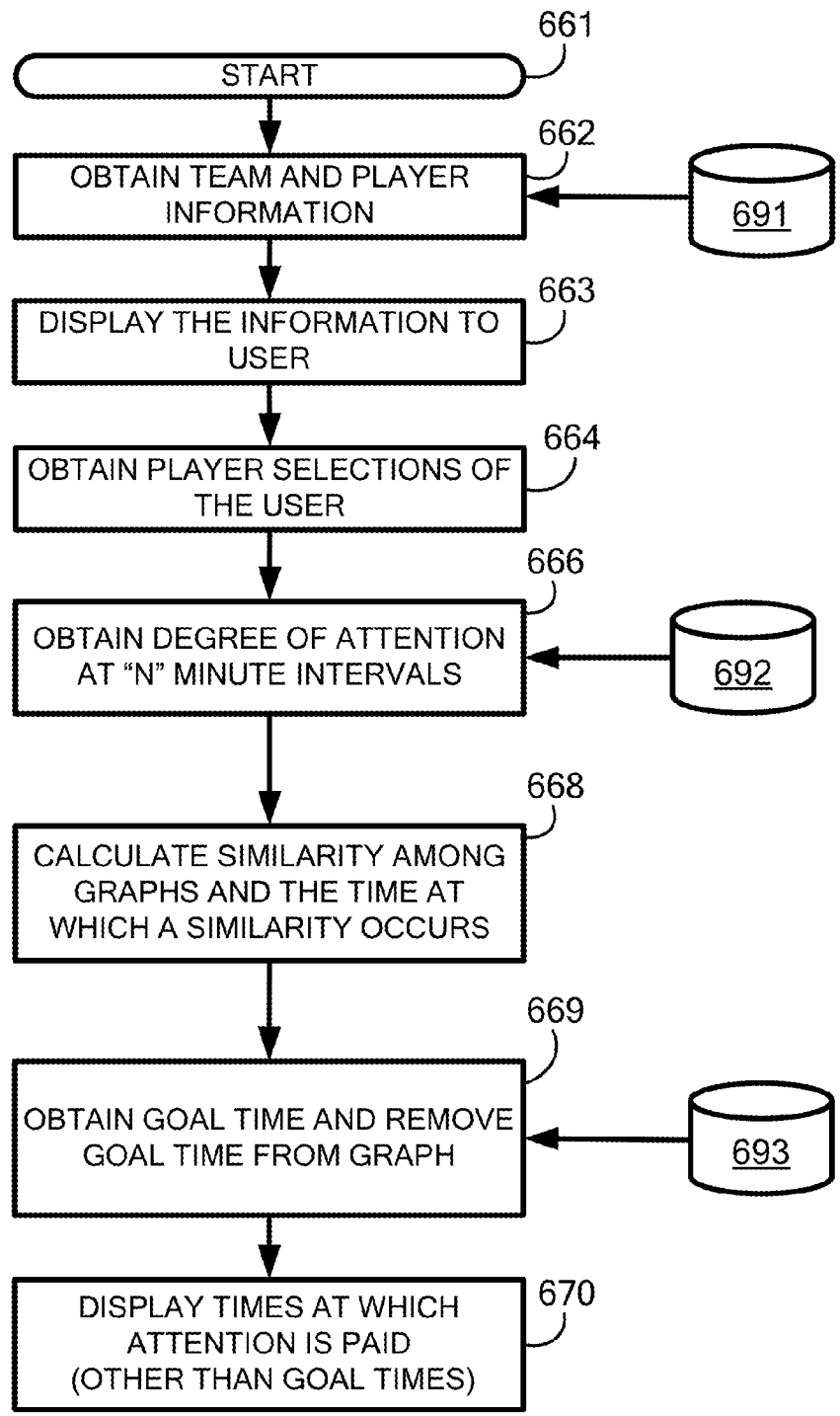
FIG. 6B illustrates a flowchart for displaying the hotspot characteristic in the exemplary display of FIG. 6A, in accordance with an embodiment of the present invention.

Referring now to FIG. 6B and with continuing reference to FIG. 6A, a flowchart for displaying the hotspot characteristics 601, 631, 632, 633 in the exemplary display of FIG. 6A, in accordance with an embodiment of the present invention, is illustrated.

At 661, computer 101 (FIG. 1) begins calculating the characteristic of the hotspot, in this exemplary embodiment the soccer players A-F of FIG. 6A, and preparing data to display those characteristics.

At 662, computer 101 may obtain team and player information for both the away team and the home team from storage 691 where the team and player information relating to the exemplary soccer event is stored.

At 663, computer 101 may display the team and player information on the display 106 (FIG. 1) of a user's personal device.

At 664, computer 101 may obtain user input selecting a plurality of players to be compared. In this exemplary embodiment, the degree of audience attention paid to the selected players may be compared.

For each selected player, computer 101 may, at 666, obtain the audience degree of attention paid to that player at n-minute intervals, where "n" is a positive number, from storage 692 where the audience degree of attention is stored. Computer 101 may create a graph using the obtained data. The interval "n" may be predefined or user specified.

At 668, computer 101 may detect a similar occurrence among hotspots over a defined time period sequence. In one embodiment, computer 101 may calculate similarity among the graphs and determine the time when a similarity occurred.

At 669, computer 101 may delete a similar occurrence from the defined time period sequence. For example, computer 101 may obtain the time a goal occurred from storage 693, where the result of the soccer game is stored, and remove the time the goal occurred from the graph. Removing the time of the goal from the graph may allow computer 101 to retrieve the time at which other game highlights occurred.

At 670, computer 101 may display the remaining similar occurrences among the hotspots, for example, by displaying the times at which the attention is paid other than when a goal is scored.

In one embodiment, computer 101 may display the exemplary display screen image 633. This display screen image may show the time at which audience attention is paid other than goal time. Accordingly, it may be considered that there is notable action between the players at that time.

In another embodiment, computer 101 may prepare the data for displaying the remaining similar occurrences among the hotspots as a sub-window or as a wipe screen on a television, and broadcast the data to the television. In such a display, the television may display the goal scene in the main-window and, simultaneously, display the remaining similar occurrences among the hotspots in a sub-window.

Figure 7:
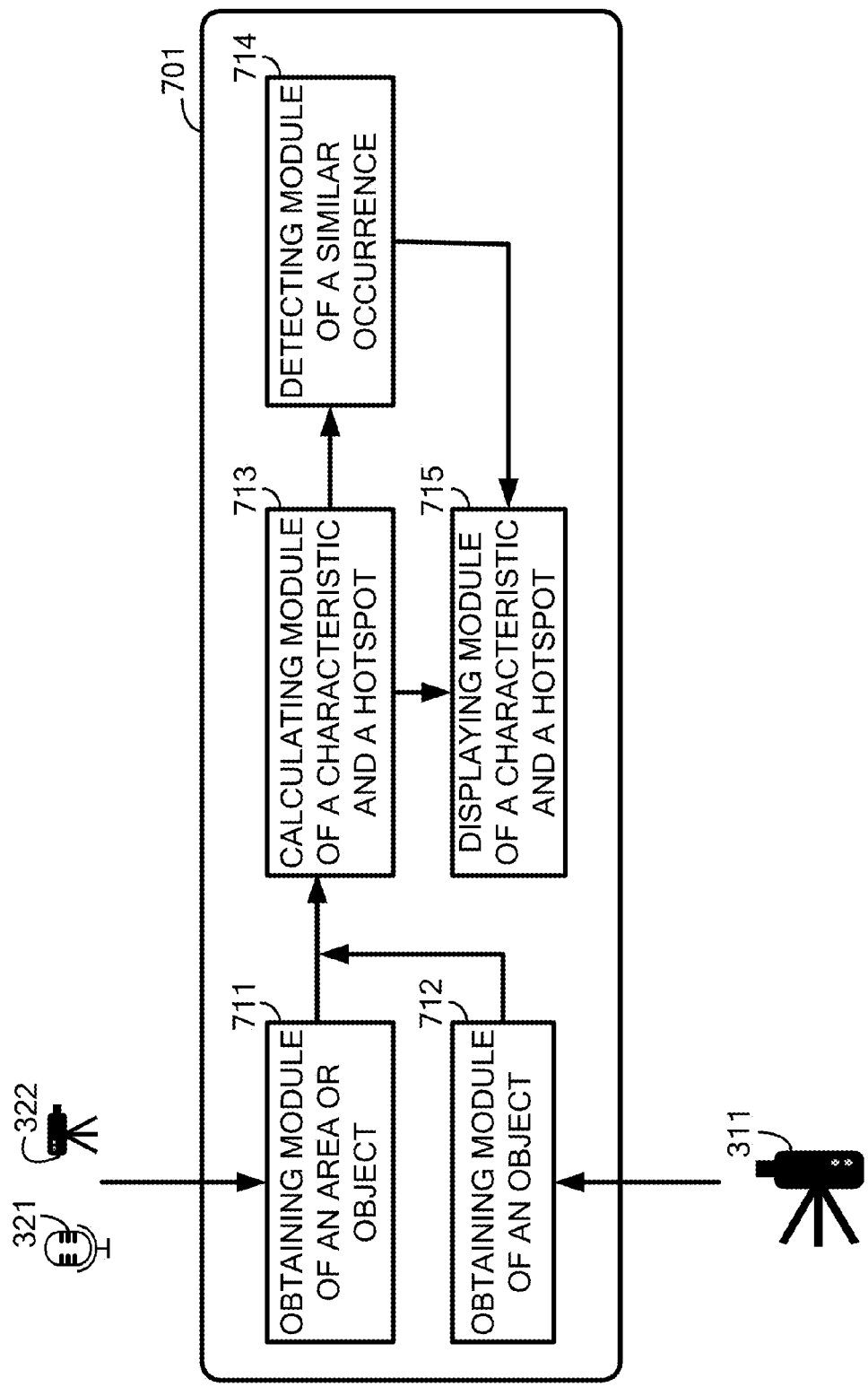
FIG. 7 illustrates a functional block diagram of an exemplary system that may be used for calculating a characteristic of a hotspot in an event, in accordance with an embodiment of the present invention.

With reference now to FIG. 7, a functional block diagram of an exemplary system that may be used for calculating a characteristic of a hotspot in an event, in accordance with an embodiment of the present invention, is illustrated.

The exemplary system 701 may include an obtaining module 711 for obtaining an area or object to which the audience pays attention, an obtaining module 712 for obtaining an object, and a calculating module 713 for calculating a characteristic and a hotspot. The system 701 may further include a detecting module 714 for detecting similar occurrences. The system 701 may further include a displaying module 715 for displaying a characteristic and a hotspot. In one embodiment, all modules 711, 712, 713, 714, 715 can be implemented in the same computer. In another embodiment, each of the modules 711, 712, 713, 714, 715 can be implemented in different computers.

The obtaining module 711 obtains an area or object to which an audience at the event pays attention and may perform the functions 242-246 of FIG. 2A.

The obtaining module 712 obtains an object in the event and may perform the functions 232-234 of FIG. 2A.

The calculating module 713 calculates the characteristic of the hotspot in the event on the basis of the area or object to which the audience at the event pays attention and the object in the event. The calculating module 713 may also calculate the hotspot in the event on the basis of the area or object to which the audience at the event pays attention and the object in the event. The calculating module 713 may also map the object with the area or object to which the audience at the event pays attention associated with that object. The calculating module 713 may perform the functions 246-247 of FIG. 2A, 252-256 of FIG. 2B, 263-264 and 273-274 of FIG. 2C.

The detecting module 714 detects a similar occurrence among hotspots during a defined time period sequence. The detecting module 714 may, in response to selection of at least two hotspots from a group of hotspots, calculate a time period in which common hotspots appear among the selected hotspots; analyze details of the occurrence in the time period of each selected hotspot to determine whether or not the occurrences among the selected hotspots have similarity in the calculated time period; and, in response to determining that the occurrences among the selected hotspots have the similarity in the calculated time period, display the calculated time period of the occurrences having the similarity among the selected hotspots. The detecting module 714 may perform the function 275 of FIG. 2C.

The displaying module 715 displays the characteristic of the hotspot in the event. The displaying module 715 may also display the hotspot. The displaying module 715 may perform the function 275 of FIG. 2C with as it relates to displaying the characteristic of the hotspot and, optionally, the hotspot.

In embodiment, if an exemplary soccer game is being broadcast, the main window may display a player who is holding a ball and, simultaneously, a sub-window may display a side-back offence and defense where the gaze of the audience at the soccer stadium is concentrated, providing a more realistic broadcast.

In an embodiment, when a director of a television station edits a recorded video of an exemplary soccer game, a scene to which the audience paid attention may be automatically provided to the director, easing the editing of the video.

In an embodiment, an exemplary sporting event, such as the Olympic Games, may be simultaneously broadcasting a plurality of athletic events via a plurality of channels. A video distribution service center may provide television guide information in which the television channel with a high degree of audience interest at the event is shown to a television viewer. Accordingly, the television viewer can change to a television channel, distributed by the video distribution service center, based on a hotspot map, such as excitement map showing attribute values such as favorable or unfavorable for each athletic event broadcast.

In an embodiment, when there are a plurality of electronic advertisement display devices, it may be possible to dynamically arrange an optimum advertisement in a specific electronic advertisement display device in an area of the venue to which a lot of the audience attention is paid, providing the ability to dynamically display a high priority advertisement in a focus area.

In various embodiments, a venue operator may advantageously understand and visualize an area of the venue to which a lot of audience attention is paid, making it possible for the venue operator to dynamically determine an appropriate number of guards to dispatch to the area.

A sponsor advertising in an event may advantageously understand and visualize the nationality of audience members in a specific audience seating area to dynamically determine appropriate advertisements to display based on the audience nationality in the seating area. Accordingly, an advertisement with high priority can be dynamically displayed close to such an area.

Goods or food sellers at an event may advantageously understand and visualize an audience's nationality ratio in a specific audience seating area and dynamically determine appropriate items to sell or appropriate sales people based on the nationality ratio.

The present invention may be a method, a system, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

By the expression "a/one" should be understood as "at least one".

By the expression "comprise(s)/comprising a/one" should be understood as "comprise(s)/comprising at least one".

By the expression "comprise(s)/comprising" should be understood as "comprise(s)/comprising at least".

By the expression "/" should be understood as "and/or".

Although preferred embodiments have been depicted and described in detail herein, it will be apparent to those skilled in the relevant art that various modifications, additions, substitutions and the like can be made without departing from the spirit of the invention, and these are, therefore, considered to be within the scope of the invention, as defined in the following claims.

What is claimed is:

1. A method for characterizing an area of interest in an event in a venue attended by an audience, the method comprising:
   receiving, by a computer from a first plurality of cameras in the venue, audience video data of the audience;
   receiving, by the computer from a second plurality of cameras in the venue, venue video data of event activity information for one or more areas in the event venue;
   determining, by the computer, one or more areas in the event venue to which the audience pays attention by analyzing the received audience video data to estimate a gaze of members of the audience;
   identifying, by the computer, one or more objects in the one or more areas in the event venue by analyzing the received venue video data based on movement of the object and further based on metadata for the objects;

determining, by the computer, one or more objects of interest in the event based on the determined one or more areas in the event venue to which the audience pays attention and the one or more identified objects in the one or more areas in the event venue;
calculating, by the computer, a characteristic of the one or more objects of interest in the event based on
the audience video data related to the one or more areas of interest in the event; and
displaying, by the computer, the characteristic of the one or more objects of interest in the event.

2. The method according to claim 1, wherein determining, by the computer, the one or more areas of interest in the event further comprises mapping, by the computer, the determined one or more objects in the one or more areas in the event venue to the determined one or more areas in the event venue to which the audience pays attention.

3. The method according to claim 1, further comprising
receiving, by a computer from a plurality of microphones in the venue, audience audio data of the audience;
and wherein determining, by the computer, one or more areas in the event venue to which the audience pays attention further comprises
determining, by the computer, one or more areas in the event venue to which the audience pays attention by analyzing the received audience video data and the received audience audio data to estimate a gaze of members of the audience.

4. The method according to claim 1, wherein determining, by the computer, one or more areas in the event venue to which the audience pays attention further comprises:
determining, by the computer, one or more areas in the event venue to which the audience pays attention by analyzing the received audience video data to estimate a gaze of members of the audience based at least on a location of one or more video cameras providing the video data of the audience attending the event, and a line of sight of the audience in the video data.

5. The method according to claim 3, wherein processing, by the computer, received audio data of the audience attending the event to obtain information relating to the audience attending the event further comprises one or more of:
processing, by the computer, the received audio data using voice recognition processing; and
processing, by the computer, the received audio data using natural language processing.

6. The method according to claim 3, wherein analyzing the received audience video data includes:
analyzing the received audience video data by using voice recognition processing and natural language processing to identify:
a proper noun included in an utterance of the audience;
a sense or feeling of the audience based on an utterance of the audience;
a spoken language of the audience based on an utterance of the audience;
a birthplace of the audience based on an utterance of the audience;
a gender of the audience based on an utterance of the audience;
an age group of the audience based on an utterance of the audience; and
a degree of mastery of the audience based on an utterance of the audience, wherein the degree of mastery of the audience includes a degree of knowledge or familiarity of the audience about the event or the area of interest.

7. The method according to claim 1, wherein displaying, by the computer, the characteristic of the one or more objects of interest in the event further comprises:
preparing, by the computer, display data including:
the one or more objects in the event venue to which the audience attending the event pays attention;
a stationary state and a state of rapid change that are visually distinguished from each other; and
an audience behavior attribute related to the characteristic of the one or more objects of interest in the event.

8. The method according to claim 7, wherein displaying, by the computer, the characteristic of the one or more objects of interest in the event further comprises:
displaying, by the computer, a display which includes:
a degree of audience attention for each of the one or more objects of interest in the event at a defined point of time;
a sequential change, over a defined time period, of the degree of audience attention for each of the one or more objects of interest in the event;
an audience behavior attribute value for each audience behavior attribute related to the characteristic of the one or more objects of interest in the event; and
a broadcasting source used by the audience to view an objects of interest in the event.

9. A computer program product for characterizing an area of interest in an event attended by an audience, the computer program product comprising:
one or more computer readable storage tangible media and program instructions stored on at least one of the one or more computer readable tangible storage media, the program instructions executable by a computer to cause the computer to perform a method comprising:
receiving, by a computer from a first plurality of cameras in the venue, audience video data of the audience;
receiving, by the computer from a second plurality of cameras in the venue, venue video data of event activity information for one or more areas in the event venue;
determining, by the computer, one or more areas in the event venue to which the audience pays attention;
identifying, by the computer, one or more objects in the one or more areas in the event venue by analyzing the received venue video data based on movement of the object and metadata for the objects;
determining, by the computer, one or more objects of interest in the event based on the determined one or more areas in the event venue to which the audience pays attention and the one or more identified objects in the one or more areas in the event venue;
calculating, by the computer, a characteristic of the one or more objects of interest in the event based on
the audience video data related to the one or more areas of interest; and
displaying, by the computer, the characteristic of the one or more objects of interest in the event.

10. The computer program product according to claim 9, wherein determining, by the computer, the one or more areas of interest in the event further comprises mapping, by the computer, the determined one or more objects in the one or more areas in the event venue to the determined one or more areas in the event venue to which the audience pays attention.

11. The computer program product according to claim 9, further comprising
receiving, by a computer from a plurality of microphones in the venue, audience audio data of the audience;

and wherein determining, by the computer, one or more areas in the event venue to which the audience pays attention further comprises
determining, by the computer, one or more areas in the event venue to which the audience pays attention by analyzing the received audience video data and the received audience audio data to estimate a gaze of members of the audience.

12. The computer program product according to claim 9, wherein determining, by the computer, one or more areas in the event venue to which the audience pays attention further comprises:
determining, by the computer, one or more areas in the event venue to which the audience pays attention by analyzing the received audience video data to estimate a gaze of members of the audience based at least on a location of one or more video cameras providing the video data of the audience attending the event, and a line of sight of the audience in the video data.

13. The computer program product according to claim 11, wherein processing, by the computer, received audio data of the audience attending the event to obtain information relating to the audience attending the event further comprises one or more of:
processing, by the computer, the received audio data using voice recognition processing; and
processing, by the computer, the received audio data using natural language processing.

14. The computer program product according to claim 11, wherein analyzing the received audience video data includes:
analyzing the received audience video data by using voice recognition processing and natural language processing to identify:
a proper noun included in an utterance of the audience;
a sense or feeling of the audience based on an utterance of the audience;
a spoken language of the audience based on an utterance of the audience;
a birthplace of the audience based on an utterance of the audience;
a gender of the audience based on an utterance of the audience;
an age group of the audience based on an utterance of the audience; and
a degree of mastery of the audience based on an utterance of the audience, wherein the degree of mastery of the audience includes a degree of knowledge or familiarity of the audience about the event or the area of interest.

15. The computer program product according to claim 9, wherein displaying, by the computer, the characteristic of the one or more objects of interest in the event further comprises:
preparing, by the computer, display data including:
the one or more objects in the event venue to which the audience attending the event pays attention;
a stationary state and a state of rapid change that are visually distinguished from each other; and
an audience behavior attribute related to the characteristic of the one or more objects of interest in the event.

16. The computer program product according to claim 15, wherein displaying, by the computer, the characteristic of the one or more objects of interest in the event further comprises:
displaying, by the computer, a display which includes:
a degree of audience attention for each of the one or more objects of interest in the event at a defined point of time;
a sequential change, over a defined time period, of the degree of audience attention for each of the one or more objects of interest in the event;
an audience behavior attribute value for each audience behavior attribute related to the characteristic of the one or more objects of interest in the event; and
a broadcasting source used by the audience to view an objects of interest in the event.

17. A computer system for characterizing an area of interest in an event attended by an audience, the computer system comprising one or more processors, one or more computer readable tangible storage media, and program instructions stored on at least one of the one or more computer readable tangible storage media, which when executed cause at least one of the one or more processors to perform a method comprising:
receiving, by a computer from a first plurality of cameras in the venue, audience video data of the audience;
receiving, by the computer from a second plurality of cameras in the venue, venue video data of event activity information for one or more areas in the event venue;
determining, by the computer, one or more areas in the event venue to which the audience pays attention;
identifying, by the computer, one or more objects in the one or more areas in the event venue by analyzing the received venue video data based on movement of the object and metadata for the objects;
determining, by the computer, one or more objects of interest in the event based on the determined one or more areas in the event venue to which the audience pays attention and the one or more identified objects in the one or more areas in the event venue;
calculating, by the computer, a characteristic of the one or more objects of interest in the event based on
the audience video data related to the one or more areas of interest; and
displaying, by the computer, the characteristic of the one or more objects of interest in the event.

18. The computer system according to claim 17, further comprising
receiving, by a computer from a plurality of microphones in the venue, audience audio data of the audience;
and wherein determining, by the computer, one or more areas in the event venue to which the audience pays attention further comprises
determining, by the computer, one or more areas in the event venue to which the audience pays attention by analyzing the received audience video data and the received audience audio data to estimate a gaze of members of the audience.

* * * * *